United States Patent [19]
Holst

[11] Patent Number: 5,870,827
[45] Date of Patent: Feb. 16, 1999

[54] SAWBLADE AND STABILIZING HANDLE ATTACHMENTS FOR A POWER DRILL

[76] Inventor: Mel Holst, 215 S.W.14th St., Gresham, Oreg. 97080

[21] Appl. No.: 829,498

[22] Filed: Mar. 27, 1997

[51] Int. Cl.⁶ .................................................. B23F 3/00
[52] U.S. Cl. ................................ 30/122; 30/388; 30/500; 30/517; 408/20; 408/22
[58] Field of Search .......................... 408/20, 22; 30/500, 30/514, 517, 122

[56] References Cited

U.S. PATENT DOCUMENTS

| | | | |
|---|---|---|---|
| 1,041,768 | 10/1912 | Frankofsky . | |
| 1,425,152 | 8/1922 | Viers . | |
| 1,850,137 | 3/1932 | Pursell | 30/500 |
| 2,261,230 | 11/1941 | Cox et al. | 30/500 |
| 2,504,880 | 4/1950 | Rittenhouse | 408/20 |
| 2,544,461 | 3/1951 | Leitzel | 30/500 |
| 2,555,048 | 5/1951 | Long | 408/20 |
| 2,662,562 | 12/1953 | Lindell | 143/43 |
| 2,714,905 | 8/1955 | Clayton | 30/500 |
| 2,787,265 | 4/1957 | Neidt | 408/20 |
| 2,982,320 | 5/1961 | Trumbult et al. | 30/500 |
| 3,009,497 | 11/1961 | Lorch | 145/35 |
| 3,042,089 | 7/1962 | Lyons | 30/500 |
| 3,510,989 | 5/1970 | Tolle | 51/170 |
| 4,317,282 | 3/1982 | Pace | 408/20 |
| 4,972,589 | 11/1990 | Povleski | 30/500 |
| 5,371,977 | 12/1994 | Liner | 451/349 |
| 5,692,574 | 12/1997 | Terada | 173/162.2 |

OTHER PUBLICATIONS

Product advertisement, Makita "3 3/8" Cordless Circular Saw (#5090D), dated at least as early as Dec. 9, 1996, 1 page.

Product advertisement, Makita "33/8" Cordless Cutter (#4190D), dated at least as early as Dec. 9, 1996, 1 page.

*Primary Examiner*—M. Rachuba
*Attorney, Agent, or Firm*—Chernoff, Vilhauer, McClung & Stenzel, LLP

[57] ABSTRACT

Attachments of the present invention are generally attached to a power drill that has a chuck with an axis of rotation. The attachments include a circular sawblade attached perpendicularly to a shaft that is removably interconnected with the chuck and a stabilizing handle rotatably attached to and supporting the shaft between the drill chuck and the sawblade. The stabilizing handle extends substantially transversely to the axis of rotation. The circular sawblade may be a replaceable sawblade or it may be integral with the shaft. The extension of the stabilizing handle may include a pivot and the gripping section if the stabilizing handle may include a hand guard. The stabilizing handle may also include a depth gauge mounted perpendicularly to both the shaft and the stabilizing handle.

17 Claims, 2 Drawing Sheets

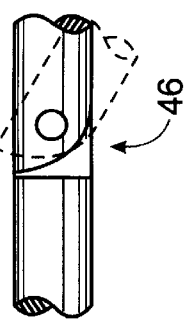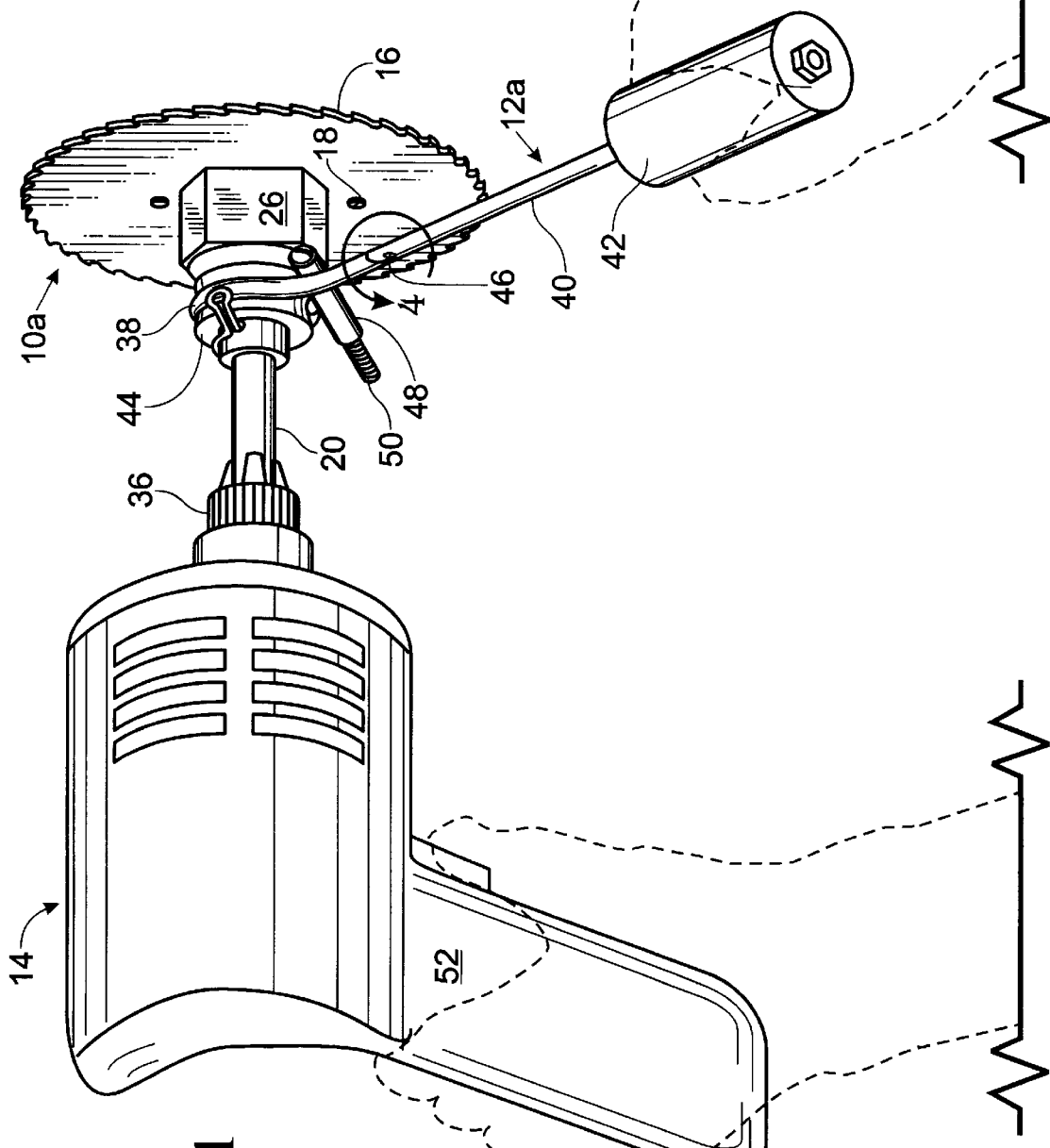

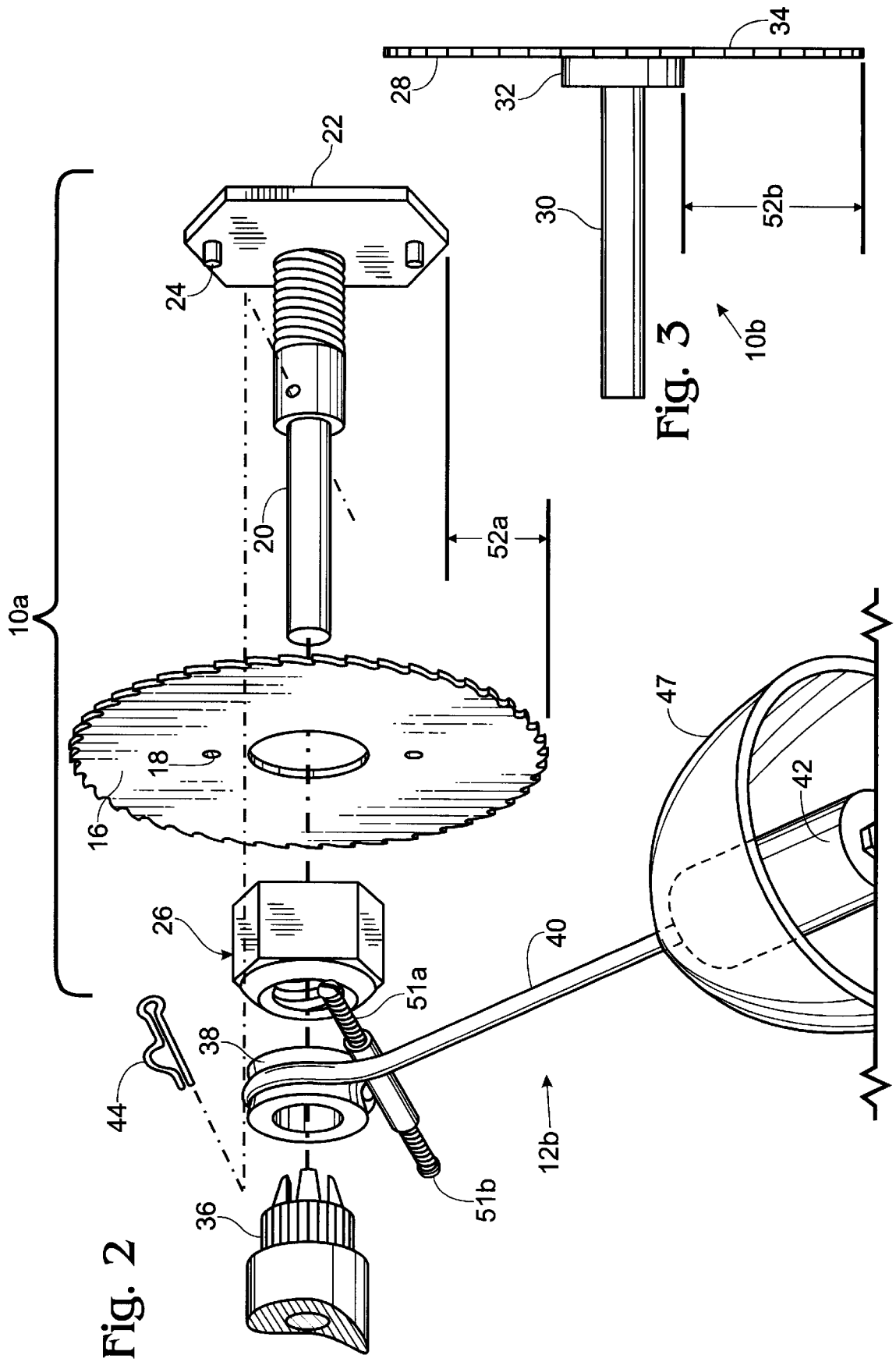

SAWBLADE AND STABILIZING HANDLE ATTACHMENTS FOR A POWER DRILL

BACKGROUND OF THE INVENTION

The present invention relates to a sawblade attachment and a stabilizing handle attachment for a power drill.

Removing a section of a wall or a ceiling can be done with such simple tools as a hammer, saw, or ax. These simple tools, however, are clumsy and inaccurate. Accordingly, modern electric tools have been developed that help to neatly cut straight lines. Because walls and ceilings are generally fixed in a specific position, generally these modern tools are small enough to be hand held. One such tool, a reciprocating saw includes a single straight blade that pulsates in and out of the wall as it cuts the wall. This motion is similar to the motion of a non-electric saw. Hand held circular saws tend to cut better than a reciprocating saw, but are often bulkier and, because of the guide plate that extends beyond the blade, cannot cut into corners.

The Makita Cordless Circular Saw #27385 and the Makita Cordless Cutter #27381 each have a circular sawblade that rotates. These saws, however, are too small to allow a user to use a second hand for stabilization. The small size, however, is directly proportional to the relatively small cutting capabilities to which this saw is suited due to its relatively weak battery and narrow blade. Also, the blade is essentially parallel to the handle. Such a configuration does not allow for ideal leverage.

Hand held circular saws such as those shown in U.S. Pat. No. 1,425,152 to Viers and U.S. Pat. No. 2,662,562 to Lindell show sawblade attachments for power drills. Like the Makita saw, the circular sawblades of these references are essentially parallel to their respective handles. Like the configuration of the Makita saw, this configuration does not allow for ideal leverage and stabilization despite having handles that allow a user to use two hands.

U.S. Pat. No. 5,371,977 to Liner and U.S. Pat. No. 3,510,989 to Tolle show abrasive wheel attachments for power drills that rotate about the drill chuck axis and have handles which extend transversely to the drill chuck axis. However, because these devices are not for cutting surfaces close to obstacles such as adjacent walls, the handles support the abrasive wheel axes at locations on the outer side of the wheels. Such a configuration would be unacceptable for a cutting blade designed to cut close to a wall or other obstacle.

BRIEF SUMMARY OF THE INVENTION

None of the references show a sawblade attachment for a power drill that makes it possible to cut a surface (such as a wall or ceiling) close to obstacles (such as a wall or ceiling) perpendicular to the cutting surface in conjunction with a stabilizing handle that provides leveraging and stabilization simultaneously while cutting. The present invention is able to do both.

The attachments of the present invention are generally attached to a power drill or other rotating apparatus that has a chuck with an axis of rotation. The attachments include a circular sawblade attached perpendicularly to a shaft that is removably interconnected with the chuck and a stabilizing handle rotatably attached to and supporting the shaft between the chuck and the sawblade. The stabilizing handle extends substantially transversely to the axis of rotation.

The circular sawblade may be a replaceable sawblade that has at least one hole that may be interconnected to at least one pin of an integral face plate of the shaft. Alternately, the circular sawblade and the shaft may be an integral unit. Depending on the embodiment, the outer face of the circular sawblade is flat or substantially flat.

The stabilizing handle may be divided into three sections: a shaft attachment bushing, an extension, and a gripping section. Preferably the shaft is journaled within the shaft attachment bushing. The extension may include an optional pivot. The gripping section may include an optional hand guard. The stabilizing handle may also include a depth gauge mounted perpendicularly to both the shaft and the stabilizing handle. The depth gauge may include one or two depth setters.

The foregoing and other objectives, features, and advantages of the invention will be more readily understood upon consideration of the following detailed description of the invention, taken in conjunction with the accompanying drawings.

BRIEF DESCRIPTION OF THE SEVERAL VIEWS OF THE DRAWING

FIG. 1 is a perspective view of one embodiment of the sawblade attachment and the stabilizing attachment of the present invention in association with a drill.

FIG. 2 is an expanded view of the sawblade attachment shown in FIG. 1 and an alternate embodiment of the stabilizing attachment.

FIG. 3 is an alternate embodiment of a sawblade attachment.

FIG. 4 is an enlarged view of a pivot.

DETAILED DESCRIPTION OF THE PREFERRED EMBODIMENT

FIG. 1 shows exemplary embodiments of a circular sawblade attachment 10a (shown in an expanded view in FIG. 2) and a stabilizing handle attachment 12a for a power drill 14. FIG. 3 shows an alternate embodiment of the circular sawblade attachment 10b. FIG. 2 shows an alternate embodiment of the stabilizing handle attachment 12b.

The circular sawblade attachment 10a shown in FIGS. 1 and 2 includes a replaceable sawblade 16 with at least one hole 18 and a removable shaft 20. The removable shaft 20 has an integral face plate 22 (FIG. 2) with at least one pin 24 for mating with the at least one hole 18 of the replaceable sawblade 20. By associating the at least one pin 24 with the at least one hole 18 the replaceable sawblade 16 is prevented from rotating freely on the removable shaft 20. A locking nut 26 or other securing apparatus is preferably used to secure the replaceable sawblade 16 next to the face plate 22 of the removable shaft 20.

FIG. 3 shows an alternate embodiment of the circular sawblade attachment 10b that includes an integrated sawblade 28 and shaft 30. As shown, the sawblade 28 and shaft 30 are interconnected by a heavy duty shoulder 32. In this embodiment the outer face 24 of the sawblade 28 is flat and unobstructed. It should be noted that alternate methods could be used to attach the sawblade 28 and the shaft 30, however, the outer face 34 of the sawblade 28 should be essentially flat and unobstructed.

With either embodiment of the circular sawblade attachment 10a, 10b, the sawblade 16, 38 rotates about the axis of rotation of the drill chuck 36. Further, the shaft 20, 30 of either embodiment is insertable into a standard drill chuck 36. Accordingly, the shaft 20, 30 has a diameter of approximately ¼ inches to ¾ inches where it mates with the drill chuck 36. It should be noted that the diameter could be adjusted for alternative chucks or other relating apparatus. Further, because the outer faces of both sawblade attachment embodiments 10a, 10b have no protruding hubs, the sawblades 20, 30 may be used in confined spaces for cutting rectilinear holes in cutting surfaces with adjacent obstacles.

Generally, a stabilizing handle attachment 12a, 12b of the present invention is rotatably attached to the shaft 20, 30 of the sawblade attachment 10a, 10b. The handle attachment 12a, 12b extends substantially transversely to the axis of rotation of the sawblade attachment 10a, 10b and rotatably supports the sawblade axis only in the area between the sawblade 16, 28 and the drill chuck 36. As shown, the handle attachment 12a, 12b has three parts: a shaft attachment bushing 38, an extension 40, and a gripping section 42.

The shaft 20, 30 is rotatably journaled within the bushing 38. The bushing 38 optionally may be held against the shoulder 32 or locking nut 26 by a cotter pin 44. Alternatively, the bushing 38 may be allowed to slide freely on the shaft 20, 30.

The extension 40 of the stabilizing handle attachment 12a shown in FIG. 1 includes an optional pivot 46 that assists the user in providing leverage. The pivot 46 may be any standard pivot, however, as shown in FIG. 4, the pivot 46 may be a slotted pivot of which one side is square and the other side is arced so that the stabilizing handle attachment 12a could pivot only in one direction. Alternatively, as shown in FIG. 2, the extension 40 of the stabilizing handle attachment 12b does not include a pivot.

The gripping section 42 of the stabilizing handle 12b shown in FIG. 2 has an additional optional hand guard 47. The hand guard 47 is preferably of transparent flexible plastic so that the user's visibility of the cutting area is not obstructed. Alternatively, the gripping section 42 of the stabilizing handle 12a shown in FIG. 1 does not include a hand guard.

The handle attachment 12a shown in FIG. 1 also includes a depth gauge 48 with a single depth setter (shown as screw 50). The depth gauge 48 is preferably mounted perpendicular to both the shaft 20, 30 and the handle 12a, 12b. The depth gauge 48, using the screw 50 as a guide, may be set at any level within the range 52a (FIG. 2), 52b (FIG. 3) defined by the point at which there is interference on the sawblade and the bottom of the blade. If, as shown, the screw 50 is inserted so that the head of the screw 50 is towards the user, the farther the screw 50 is set in the depth gauge 48, the more shallow the cut the sawblade 10a, 10b will be able to make. The converse would also be true. However, by using the single screw 50, the user would have to adjust the screw 50 almost every time the unit is turned, as will be described below.

FIG. 2 shows a depth gauge 48 with two depth setters (shown as screws 51a and 51b). As mentioned above, the depth gauge 48 is preferably mounted perpendicular to both the shaft 20, 30 and the handle 12a, 12b. The depth gauge 48, using the both screws 51a, 51b as guides, may be set at any level within the range 52a (FIG. 2), 52b (FIG. 3). Because two screws 51a and 51b are set, the user would not have to make adjustments when the unit is turned, as will be described below.

In use, the drill 14 is held by its handle 52 in one hand and the gripping section 42 is held in the other hand. This enables the user to advance the sawblade 10a, 10b in a cutting direction while steadying the sawblade against kickback. If a wall, ceiling, floor, or other obstacle is on the right side of the cutting surface, the user would hold the drill handle 52 in his left hand and the gripping section 42 in his right hand. If the user encounters an obstacle on the left (for example, if the user is cutting a rectangular section between two walls), the unit may be turned so that the user would hold the drill handle 52 in his right hand and the gripping section 42 in his left hand. Also, to prevent kickback, the direction of rotation of the sawblade 10a, 10b is preferably changed.

It should be noted that the features discussed above can be interchanged to form additional embodiments. For example, an alternate stabilizing handle might have both a pivot and a hand guard. Another example is that the sawblade attachment 10b shown in FIG. 3 may be used with handles 12a, 12b, or an alternate handle. Yet another example is that, by adding a hole in the shaft 30, a cotter pin 44 may be used to secure the bushing 38 against the shoulder 32.

The features shown may be modified without changing the scope of the invention. For example, the sawblades 16, 28 may have a large diameter than those shown to allow deeper cuts. Another example is that the depth gauge 48 and screws 50, 51a, 51b may be replaced with other apparatus that limits how deep the sawblades 16, 28 can cut. Still further, the saw may be cordless or may use a cord, especially for longer and more difficult cutting jobs.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

I claim:

1. Attachments for a power drill having a drill chuck with an axis of rotation, said attachments comprising:
   (a) a circular sawblade perpendicular to a shaft;
   (b) said shaft being removably interconnected with said drill chuck such that said sawblade rotates about the axis of rotation; and
   (c) a stabilizing handle rotatably attached to and supporting said shaft between said drill chuck and said sawblade, said stabilizing handle extending substantially transversely to the axis of rotation.

2. The attachments of claim 1 wherein said circular sawblade is a replaceable sawblade.

3. The attachments of claim 1 wherein said circular sawblade has at least one hole and said shaft has an integral face plate with at least one pin adapted to mate with said at least one hole.

4. The attachments of claim 3 wherein said face plate is relatively thin.

5. The attachments of claim 1 wherein a securing apparatus secures said circular sawblade to said shaft.

6. The attachments of claim 1 wherein said circular sawblade and said shaft are an integral unit.

7. The attachments of claim 6 wherein an outer face of said circular sawblade is flat.

8. The attachments of claim 1 wherein said stabilizing handle has a shaft attachment bushing, an extension, and a gripping section.

9. The attachments of claim 8 wherein said shaft is journaled within said shaft attachment bushing.

10. The attachments of claim 8 wherein said extension is divided into two sections by a pivot.

11. The attachments of claim 8 wherein said gripping section has a hand guard.

12. The attachments of claim 8 wherein said extension has depth gauge.

13. The attachments of claim 12 wherein said depth gauge mounted perpendicularly relative to both said shaft and said stabilizing handle.

14. The attachments of claim 8 wherein said extension has depth gauge with a single depth setter.

15. The attachments of claim 8 wherein said extension has depth gauge with two depth setters.

16. A method for cutting a surface having obstacles at an angle thereto, said method comprising the steps of:

(a) providing a power drill having a drill handle and a drill chuck with an axis of rotation;

(b) providing a circular sawblade perpendicular to a shaft;

(c) rotatably attaching a stabilizing handle to said shaft;

(d) removably interconnecting said shaft with said drill chuck such that said sawblade rotates about the axis of rotation, said stabilizing handle is positioned between said sawblade and said drill chuck, and said stabilizing handle extends substantially transversely to said axis of rotation;

(e) gripping said drill handle in a first hand and said stabilizing handle in a second hand;

(f) using said sawblade to cut the surface; and (g) upon encountering said obstacles, gripping said drill handle in said second hand and said stabilizing handle in said first and using said sawblade to cut the surface.

17. Attachments for a power drill having a drill chuck with an axis of rotation, said attachments comprising:

(a) a circular sawblade perpendicular to a shaft, said sawblade having an outer radius;

(b) said shaft being removably interconnected with said drill chuck such that said sawblade rotates about the axis of rotation; and (c) a stabilizing handle rotatably attached to and supporting said shaft between said drill chuck and said sawblade, said stabilizing handle extending substantially transversely to the axis of rotation, and said stabilizing handle extending beyond said outer radius of said sawblade.

* * * * *